(12) United States Patent
Khan et al.

(10) Patent No.: US 6,363,408 B1
(45) Date of Patent: Mar. 26, 2002

(54) METHOD AND APPARATUS FOR SUMMING SELECTED BITS FROM A PLURALITY OF MACHINE VECTORS

(75) Inventors: Umair A. Khan, Fremont; Nazar A. Zaidi, San Jose, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/183,084

(22) Filed: Oct. 30, 1998

(51) Int. Cl.[7] ................................................. G06F 7/50
(52) U.S. Cl. ............................................................. 708/670
(58) Field of Search ................................. 708/670, 706, 708/714

(56) References Cited

U.S. PATENT DOCUMENTS

| | | | | |
|---|---|---|---|---|
| 4,707,800 A | * | 11/1987 | Montrone et al. | 708/714 |
| 5,163,020 A | * | 11/1992 | Chau | 708/714 |
| 5,198,993 A | * | 3/1993 | Makakura | 708/714 |
| 5,327,369 A | * | 7/1994 | Ashkenazi | 708/714 |

* cited by examiner

*Primary Examiner*—Tan V. Mai
(74) *Attorney, Agent, or Firm*—Blakely, Sokoloff, Taylor & Zafman LLP

(57) ABSTRACT

An apparatus is provided for adding selected bits. The apparatus includes a hardware device having a plurality of ordered input terminals to receive binary signals for a portion of an ordered set of the selected bits. The hardware device also has a plurality of output terminals to transmit digital signals for a plurality of sums. Each sum adds a set of speculative values of a portion of the selected bits. A method is provided for adding a set of ordered selected logic signals. The method includes producing a set of digital signals for a plurality of sums and selecting one of the digital signals for a sum in response to receiving a signal for a correction vector. Each sum adds a set of speculative values for an ordered set of selected logic signals. The selected sum is equal to a sum of speculative values of the selected logic signals as identified by the correction vector. The method also includes transmitting the selected one of the digital signals to an output terminal.

30 Claims, 7 Drawing Sheets

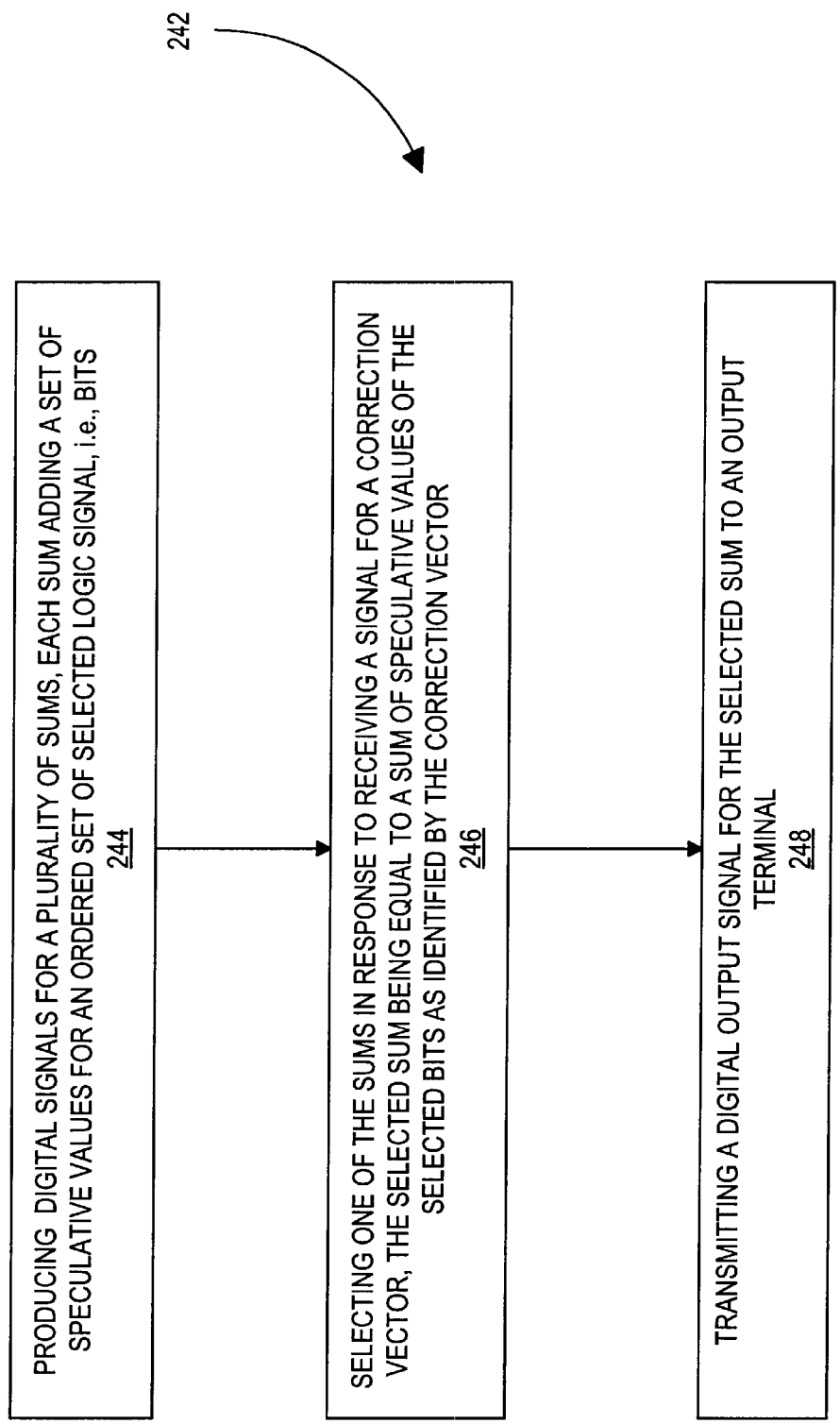

METHOD AND APPARATUS FOR SUMMING SELECTED BITS FROM A PLURALITY OF MACHINE VECTORS

BACKGROUND OF THE INVENTION

1. FIELD OF THE INVENTION

The invention relates generally to digital data processing systems and, more particularly, to methods and apparatuses for summing selected bits from a plurality of ordered machine vectors.

2. DESCRIPTION OF THE RELATED ART

A processor or other digital data processing system may employ a variety of methods and apparatuses to execute instructions more efficiently. One method that can increase the overall instruction throughput is parallel processing. Parallel processing entails executing instructions concurrently. A method that can facilitate parallel processing is the decoding of macro-instructions into micro-operations ("μops"). The μops execute on simpler execution units.

Processor hardware manipulates μops as machine vectors of binary logic signals or bits. Processing of sops may include performing arithmetic operations on bits of the machine vectors. If these arithmetic operations are slow, the overall instruction throughput may decrease.

In parallel processing, one common operation is the transfer of a group of machine as vectors to a buffer having multiple storage addresses. The group may be a mixture of machine vectors for valid μops and machine vectors for nonsense, e.g., machine vectors for μops processed in previous cycles. In such transfers, each machine vector may carry a valid bit to indicate whether the machine vector represents a valid μop. A first value of the valid bit, ie., logic one, indicates a machine vector for a valid μop and a second value of the valid bit, i.e., logic zero, indicates a machine vector not related to a valid μop. Herein, a logic signal is defined to be the digital signal associated with transmitting one bit of a machine vector.

One procedure to transfer a group of machine vectors writes the machine vectors of the group for valid μops to a circular receiving buffer in parallel while disregarding other machine vectors of the group. The procedure includes calculating a storage address in the receiving buffer for each machine vector to be written. To calculate a storage address for a machine vector for a valid μop, the valid bits of earlier machine vectors of the group are summed. Then, a sequential storage address is assigned to the machine vector for the valid μop. The sequential address is the numerical sum of the last address for the previous group of machine vectors written to the buffer plus the sum of the valid bits of the earlier machine vectors of the present group. This procedure writes machine vectors of valid μops to the buffer without leaving unused buffer addresses between successive machine vectors and enables parallel writes of groups of machine vectors.

FIG. 1 illustrates a prior art adder that sums selected bits of an incoming group of ordered machine vectors by generating several partial sums of the selected bits and serially adding the partial sums. The selected bits of an incoming group of machine vectors, enter the adder from lines 101, 102, 103 and 104. The lines 101 and 103 may carry selected bits from several machine vectors. In the adder 100, the selected bits on each line 101, 102, 103 and 104 correspond to the valid bits of the μops produced by decoding one macro-instruction. The lines 101, 102, 103 and 104 connect to ordered inputs of a correction circuit 110. The correction circuit 110 receives a correction vector signal from lines 115. The correction circuit 110 corrects the selected bits received from the lines 101, 102, 103 and 104 and transmits "corrected" selected bits to lines 105, 106, 107 and 108 in response to receipt of the correction vector. For example, the correction circuit 110 may reset a portion of the valid bits to logic zero, i.e., corresponding to "invalid" μops, in response to an exception that requires the corresponding μops to be flushed.

Still referring to FIG. 1, an adder 120 generates a first sum of the corrected selected bits from the lines 105 and transmits the first sum to a line 121. The digital signal on the line 121 sums the selected bits on lines 101 as modified by the correction vector. In the illustrated adder 100, the lines 102, 106, 104 and 108 transmit one bit. The adder 124 adds the corrected selected bit from the line 106 to the first sum from the line 121 and transmits the resulting sum to a line 125. The line 125 transmits a sum of the selected bits from the input lines 101 and 102 as modified by the correction vector. The adder 122 sums the corrected selected bits from the lines 107 and transmits the resulting sum to a line 123. An adder 126 sums the earlier sums from the line 123 and the line 125 and transmits the resulting sum to a line 127. The digital signal on the line 127 sums the selected bits from the input lines 101, 102 and 103 as corrected by the correction vector. The decoded number generators 128 and 129 convert the sums from the lines 127 and 121, respectively, to decoded numbers.

Referring again to FIG. 1, the adder 100 produces decoded number signals on a line 131 and on a line 130 for two respective partial sums. The first partial sum adds the selected bits from the lines 101, and the second partial sum adds the selected bits from the lines 101, 102 and 103. Before forming sums, the selected bits are corrected by the correction circuit 110. Finally, the partial sums in decoded form may be used in circuits for selecting addresses (not shown).

Decoded numbers are binary numbers with zeroes for all digits except one. For example, the binary numbers 0011 and 0101 (decimal numbers 3 and 5, respectively) are written as the respective "six-digit" decoded numbers 001000 and 100000, respectively. Decoded numbers can have different total numbers of digits in different hardware devices. Decoded numbers may be used for selecting one of a plurality of addresses. The number of possible addresses is the total number of digits in the decoded number.

The conventional adder 100 of FIG. 1 may reduce the speed for instruction processing for several reasons. First, the adders 120, 122, 124 and 126 sum non-decoded numbers, and summing non-decoded numbers may involve more complex and/or slower circuitry. Second, the correction circuit 110 may introduce delays, because the correction circuit 110 waits for the arrival of the correction vector from the line 115 before processing the group of selected bits from the lines 101, 102, 103 and 104. If the group of selected bits is available early, waiting to receive the correction vector may delay the processing of the selected bits and of the corresponding ,μops.

The present invention is directed to overcoming, or at least reducing the effects of, one or more of the problems set forth above.

SUMMARY OF THE INVENTION

In a first aspect, the invention provides an apparatus for adding selected bits. The apparatus includes a hardware device having a plurality of ordered input terminals to receive binary signals for a portion of an ordered set of the selected bits. The hardware device also has a plurality of output terminals to transmit digital signals for a plurality of sums. Each sum adds a set of speculative values of a portion of the selected bits.

In a second aspect, the invention provides a method for adding a set of ordered selected logic signals. The method includes producing a set of digital signals for a plurality of sums and selecting one of the digital signals for a sum in response to receiving a signal for a correction vector. Each sum adds a set of speculative values for an ordered set of selected logic signals. The selected sum is equal to a sum of speculative values of the selected logic signals as identified by the correction vector. The method also includes transmitting the selected one of the digital signals to an output terminal.

BRIEF DESCRIPTION OF THE DRAWINGS

Other objects and advantages of the invention will become apparent upon reading the following detailed description and upon reference to the drawings in which:

FIG. 2C is a flowchart illustrating a method for producing sums from selected bits of an ordered group of machine vectors;

Figure 1:
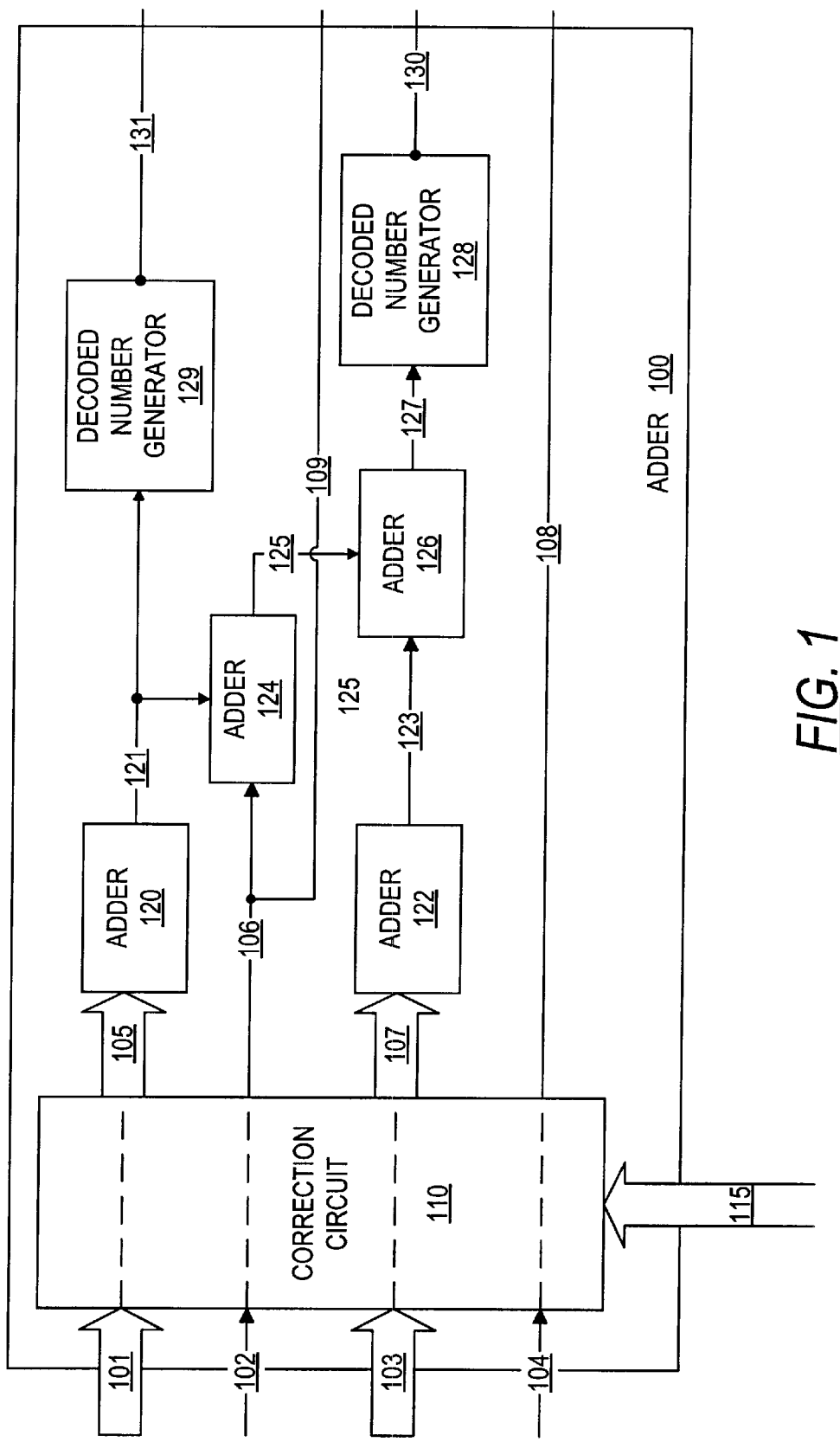
FIG. 1 is a block diagram illustrating a prior art adder that adds selected bits from a group of machine vectors.

While the invention is susceptible to various modifications and alternative forms, specific embodiments have been shown by way of example in the drawings and are described in detail. It should be understood, however, that the description herein of specific embodiments is not intended to limit the invention to the particular forms disclosed. On the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below as they might be employed in a method and apparatus to add bits. In the interest of conciseness, not all features of an actual implementation are described in this specification. It will of course be appreciated that in the development of any actual embodiment, numerous implementation-specific decisions must be made to achieve the developer's specific goals, such as compliance with system-related and business-related constraints. Moreover, it will be appreciated that even if such a development effort might be complex and time-consuming, it would nevertheless be a routine undertaking for one of ordinary skill having the benefit of this disclosure.

Figure 2A:
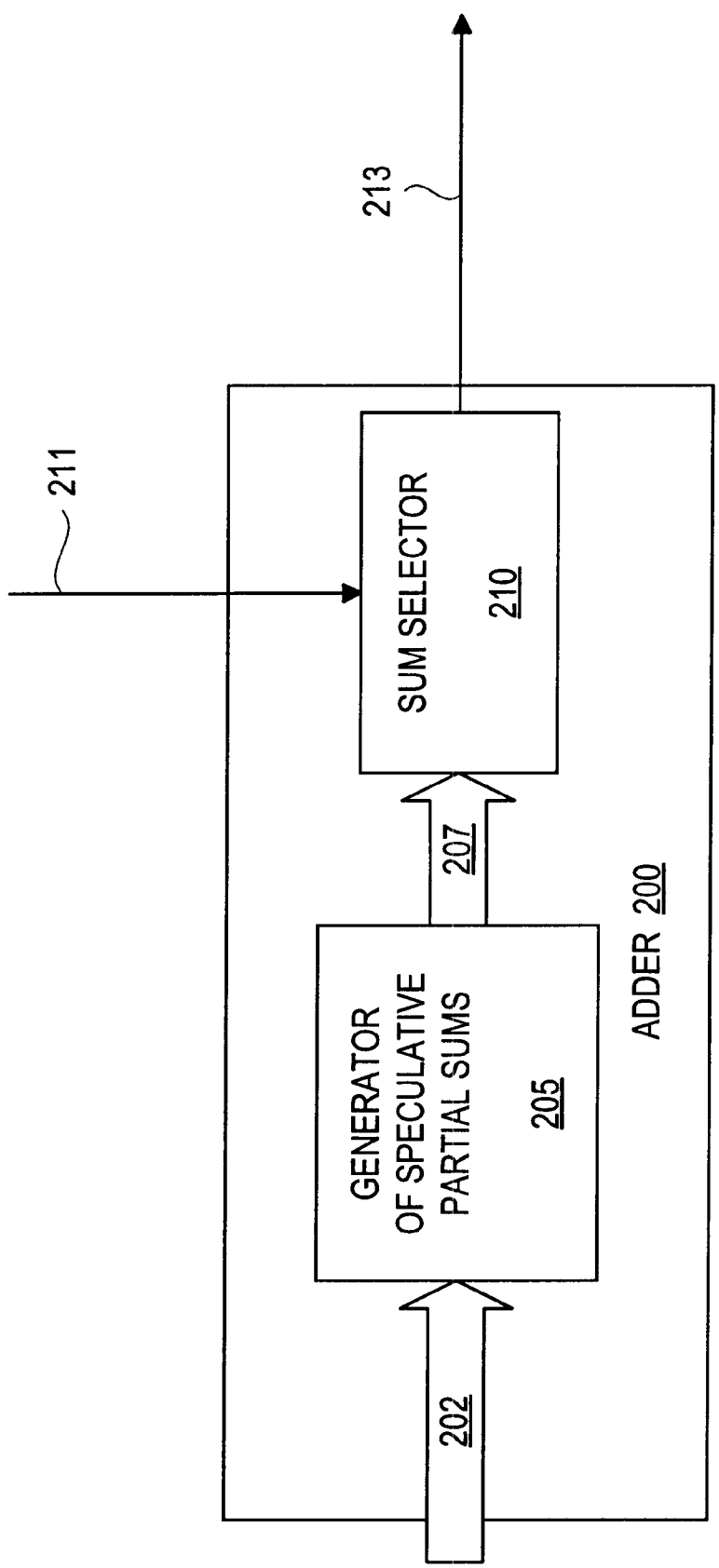
FIG. 2A is a block diagram illustrating one embodiment of the present invention that includes an adder that adds selected bits from a group of machine vectors.

FIG. 2A illustrates an adder 200 constructed and operating in accordance with one particular embodiment of the invention. The adder 200 receives an ordered set of selected bits from lines 202. The selected bits come from individual machine vectors belonging to an ordered group of machine vectors. In one embodiment, the machine vectors correspond to $\mu$ops, and the selected bits are valid bits of the $\mu$ops. The lines 202 transmits a number of selected bits equal to the maximum number of machine vectors received in each incoming group of machine vectors, i.e., greater than or equal to the number of valid incoming $\mu$ops. A generator of speculative partial sums ("GSPS") 205 receives the selected bits from the lines 202 and produces a plurality of signals on lines 207 that include decoded numbers for the speculative partial sums. The speculative partial sums are partial sums of speculative values of the selected bits from the lines 202. As will be described below, a correction vector selects one set of speculative values for the selected bits.

Still referring to FIG. 2A, one embodiment produces the plurality of the speculative partial sums $B_1$, $B_1+B_2$, $B_1+B_2+B_3$, ..., $B_1+B_2+...+B_N$ on the lines 207 from the selected bits, $B_1$, $B_2$, ..., $B_N$ received from the lines 202. The correction vectors select among the speculative values of selected bits $B_1$, $B_2$, ..., $B_N$ appearing in the speculative sums. Other embodiments sum other combinations of the ordered selected bits received on the lines 202. The exact choice of the combinations of ordered selected bits added in the partial sums is not essential to the invention.

Referring again to FIG. 2A, the correction vector from a line 211 selects one of the sets of speculative values for the selected bits from the lines 202, i.e., by defining a "corrected" value for each of the selected bits. The speculative partial sums of selected bits from the lines 207 are the possible partial sums for the various "corrected" values of the incoming selected bits. For example, there could be ten values for a speculative partial sum on the lines 207 if there were ten sets of possible corrected values for the portion of the selected bits appearing in the partial sum.

As illustrated in FIG. 2A, the decoded signals for the speculative partial sums are transmitted to a sum selector ("SS") 210 via the lines 207. The SS 210 also receives a digital signal for the "correction vector" from the line 211. As discussed above, the correction vector indicates whether the values of the selected bits have been corrected from the values received from the lines 202. The SS 210 selects the values of the speculative partial sums from the lines 207 that correspond to partial sums of the selected bits, which have been corrected as indicated is by the correction vector. The SS 210 transmits decoded signals for the selected values of the speculative partial sums to a line 213. Thus, the SS 210 uses the correction vector from the line 211 to select among the various speculative partial sums from the lines 207. The selected speculative sums transmitted on the line 213 are equal to sums of selected bits, which have been corrected as indicated by the correction vector.

Still referring to FIG. 2A, the adder 200 sums speculative values of at least a portion of the selected bits from the lines 202 prior to using the correction vector to select the proper value for the selected bits appearing in the sums. The adder 200 can perform sums without waiting for the arrival of the correction vector, because the adder 200 calculates partial sums "speculatively" as opposed to the "unspeculatively" in the prior art adder 100 of FIG. 1. Subsequently, the adder 200 uses the correction vector from the line 211 for selecting the correct sum from the previously generated speculative sums. If the selected bits arrive on the lines 202 earlier than the correction vector arrives on the line 211, the adder 200 may generate the final sums on the line 213 faster than the prior art adder 100 of FIG. 1, because a portion of the wait period for the correction vector has been eliminated.

Figure 2B:
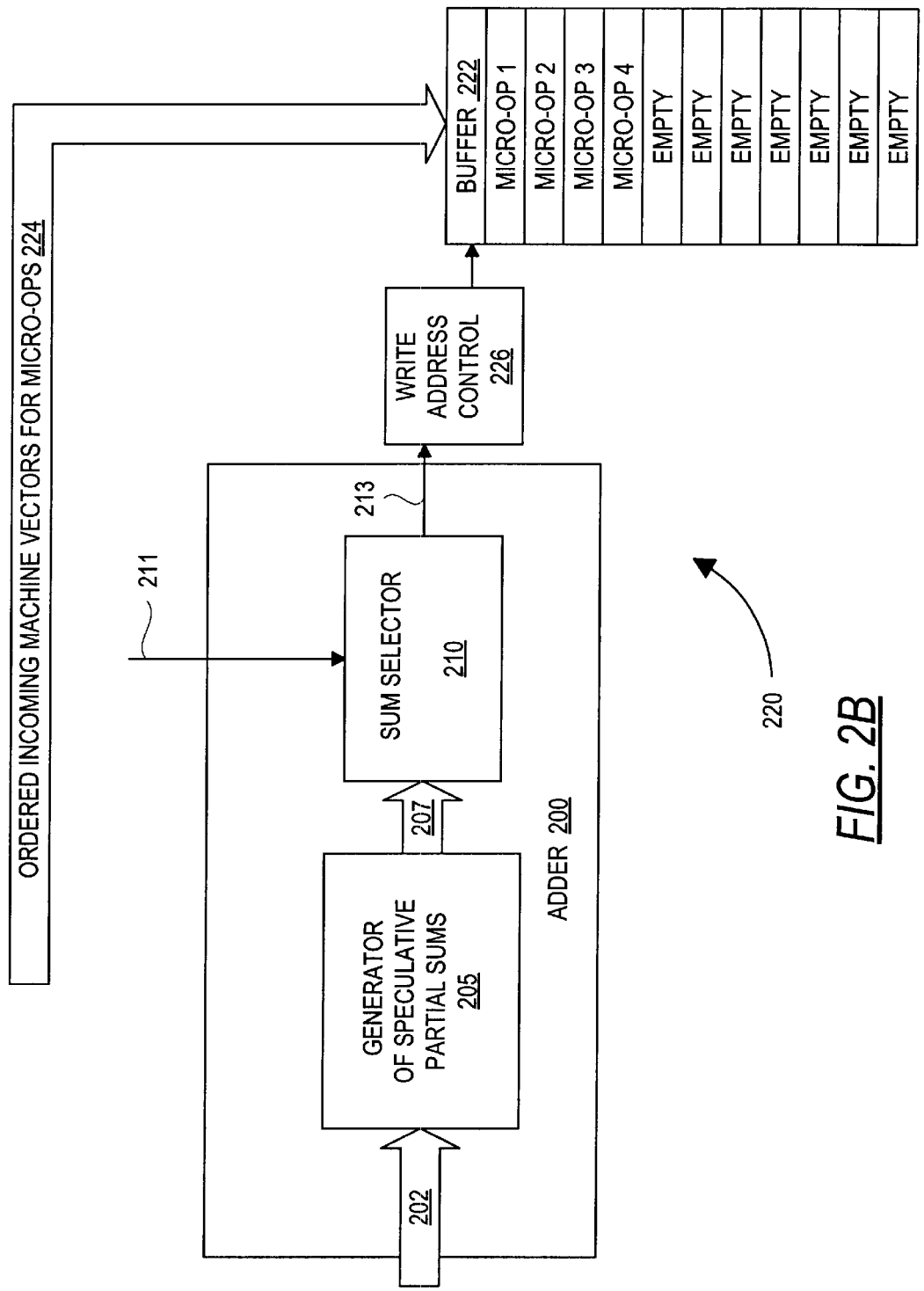
FIG. 2B is a block diagram of a circular buffer that uses the adder of FIG. 2A to assign consecutive storage addresses in the buffer to machine vectors for valid micro-ops.

FIG. 2B illustrates a device 220 that employs the partial sums generated on the line 213 of the adder 200 of FIG. 2A to assign machine vectors for valid μops to empty addresses in a circular buffer 222. In the device 220, the selected bits from the lines 202 are the valid bits of the machine vectors received on lines 224. The device 220 receives groups of the machine vectors and performs parallel writes to consecutive storage addresses in the buffer 222 for the machine vectors for valid μops in each group.

Still referring to FIG. 2B, the write address controller 226 uses the partial sums from the line 213 to assign storage addresses in the buffer 222 to the machine vectors for valid μops. Each machine vector from the lines 224 has a corresponding partial sum from the line 213, i.e., the partial sum equals the number of preceding ordered machine vectors for valid μops. The partial sums from the line 213 determine how much buffer space will be used to store all earlier ordered machine vectors for valid μops. The write address controller 226 assigns the machine vectors for a valid μop, to consecutive addresses in the circular buffer 222 so that addresses of the circular buffer 222 are not wasted storing invalid μops. The write address controller 226 uses the partial sums from the line 213 to calculate storage addresses so that the machine vectors for valid μops, from an incoming group of machine vectors, can be written to consecutive buffer addresses in parallel.

Referring again to FIG. 2B, one embodiment uses the selected bits from the lines 202 to indicate whether incoming machine vectors correspond to valid new μops produced by decoding incoming macro-instructions. Since different macro-instructions may decode into different numbers of μops, the number of machine vectors that correspond to valid new μops changes with the decoding of each new group of macro-instructions. Thus, each machine vector has a selected bit to indicate whether the machine vector corresponds to a μop produced by decoding of the current macro-instructions being processed. The selected bits enter the device 220 on the lines 202.

FIG. 2C is a flowchart illustrating a method 242 for adding an ordered set of logic signals. At block 244, a hardware device, e.g., the GSPS 205 of FIG. 2A, produces a set of digital signals for a plurality of sums. Each sum adds a set of speculative values for an ordered set of selected logic signals, ie., bits. At block 246, a second hardware device, e.g., the SS 210 of FIG. 2A, selects one of the sums in response to receiving a signal for a correction vector. The selected sum equals a sum of speculative values of the selected bits as identified by the correction vector. At block 248, the second hardware device transmits a digital output signal for the selected sum to an output terminal.

Figure 3A:
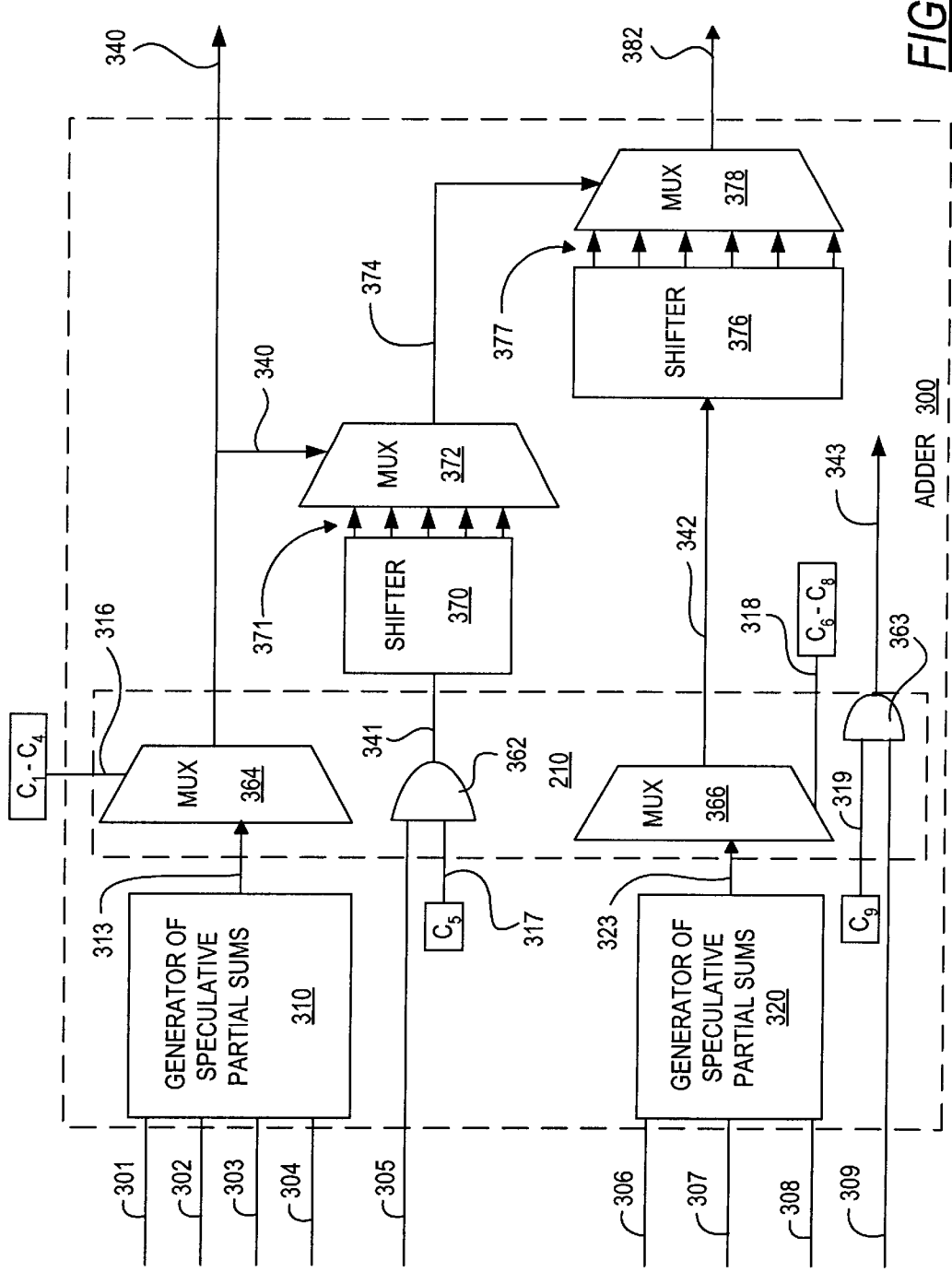
FIG. 3A is a block diagram illustrating one embodiment of the adder of FIG. 2A.

FIG. 3A is a block diagram of one embodiment 300 for the adder 200 of FIG. 2A. The adder 300 has nine input lines 301–309 for receiving the valid bits of nine machine vectors. The nine lines 301–309 split into a first set of lines 301–304, a second set of one line 305, and a third set of lines 306–309. In some embodiments, the sets of lines 301–304, 305, 306–309 receive the valid bits produced by decoding separate macro-instructions into μops. The adder 300 is adapted to receive four valid bits from the lines 301–304, one valid bit from the line 305, and four valid bits from the lines 306–309, because first, second, and third macro-instructions decode into up to four, one, and four μops, respectively, in the illustrated embodiment. The invention is also intended to cover adders with other numbers and groupings of lines in the lines 202 of FIG. 2A, e.g., for adding valid bits in a processor that decodes other numbers of macro-instructions and/or produces other numbers of μops to be parallel processed.

Still referring to FIG. 3A, the lines 301–304 connect to ordered inputs of a first generator of speculative partial sums ("GSPS") 310, and the lines 306–308 connect to ordered inputs of a second GSPS 320. The GSPS's 310 and 320 produce decoded signals for a plurality of partial sums for sets of speculative values of valid bits. Each of the sums is speculative, because the sum adds a set of "speculative" values of the valid bits.

Figure 3B:
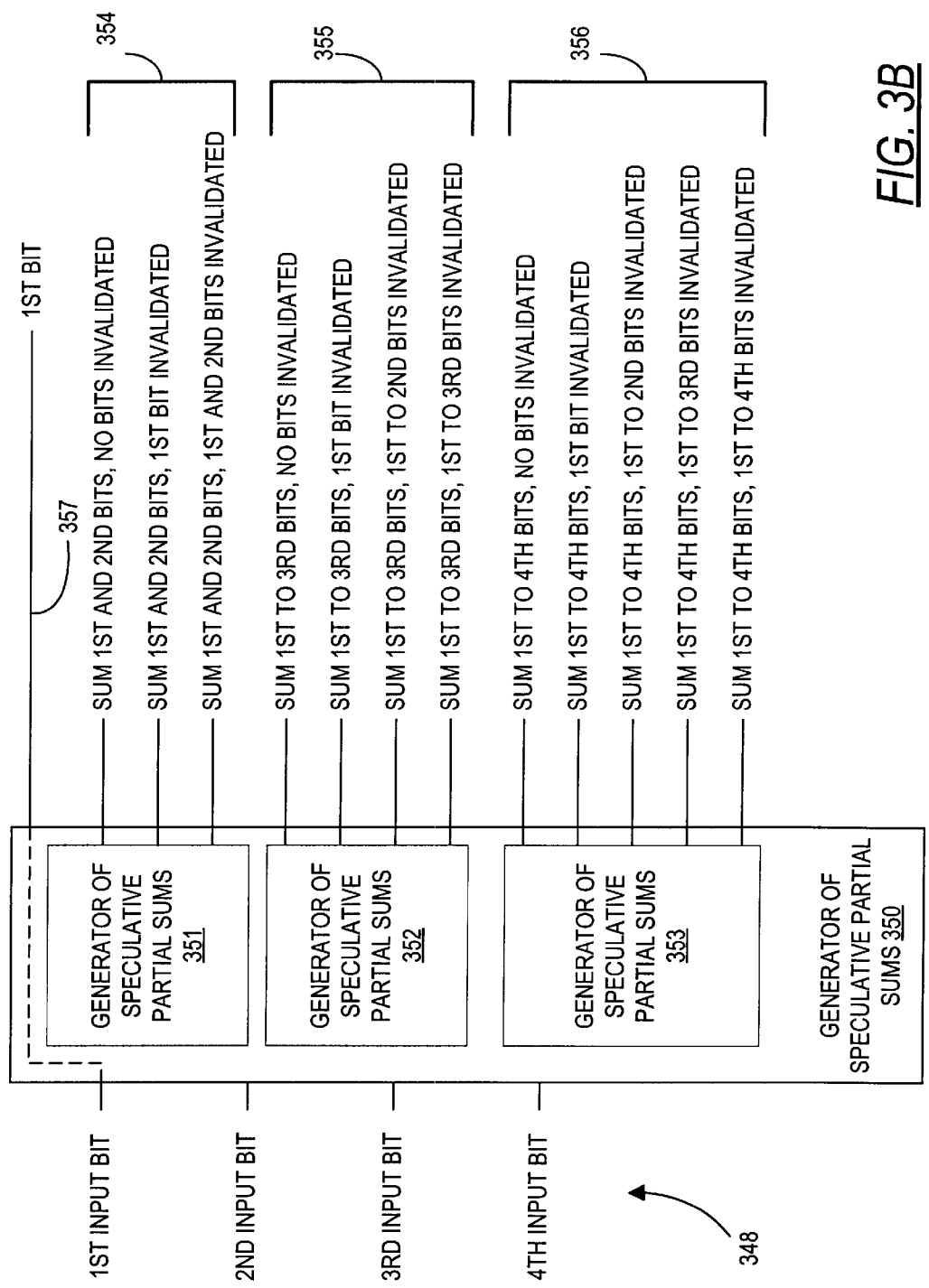
FIG. 3B illustrates one embodiment for a generator of speculative partial sums employed in FIG. 3A.

FIG. 3B illustrates a particular embodiment 350 of the GSPS 310 of FIG. 3A. An ordered group of four valid bits enter at the input terminals 348. In FIG. 3A, one of the lines 301–304 would connect to each of the input terminals 348. The GSPS 350 includes three GSPS's 351, 352 and 353, which produce sums of speculative values for the first two, the first three and the first four valid bits from the input ordered terminals 348. On a line 357, the GSPS 350 transmits the first ordered valid bit received on the terminals 348. On lines 354, the GSPS 351 transmits signals for the sums of the speculative values of the first two valid bits received on the terminals 348. The signals for values of the sum on the lines 354 correspond to the different sets of speculative values for the first and second valid bits. On lines 355, the GSPS 352 transmits signals for a sum for a plurality of values of speculative values of the first three valid bits received on the terminals 348. The signals for values of the sum on the lines 355 correspond to the different speculative values for the first, second, and third valid bits. On lines 356, the GSPS 353 transmits signals for sums for a plurality of speculative values of all four valid bits received on the terminals 348. The signals for the sums on the lines 356 correspond to the different speculative values for the four valid bits from the lines 348.

Still referring to FIG. 3B, one can illustrate the operation of GSPS 350 by an example in which the first, second, third, and fourth valid bits from the lines 348 have the respective values 0,1,1, and 0. For these actual values of the valid bits, the three ordered speculative values for the partial sum on the output lines 354 are 1, 1, and 0. Similarly, for these values of the valid bits, the four ordered speculative values for the partial sum on the output lines 355 are 2, 2, 1, and 0. Finally, for these values of the valid bits, the five ordered speculative values for the sum on the output lines 356 are 2, 2, 1, 0 and 0. If the correction vector on the lines 316 in FIG. 3A invalidates the first and second bits, ie., makes the first and second bits logic zero, then the sum selector 210 of FIGS. 2A and 3A would select the respective values for the sums 0, 1 and 1 from the lines 354, 355 and 356.

One embodiment of the GSPS 320 of FIG. 3A also employs the GSPS 350 of FIG. 3B with the modification that the lines 306–308 only connect to the first three ordered input terminals 348 of the GSPS 350. Similarly, the speculative partial sums of the GSPS 320 come from the output lines 357, 354 and 355, respectively, of the GSPS 350. The invention is also intended to cover other forms for the GSPS's 320, 310 that persons of skill in the art and having the benefit of this disclosure would be able to construct and use without undue experimentation.

Referring to FIGS. 3A and 3B, the speculative partial sums produced by the GSPS 350 of FIG. 3B correspond to five different speculative states for the portion of the correction vector; $C_1$, $C_2$, $C_3$, $C_4$; received on the line 316 in FIG. 3A. The states for the portion of the correction vector received on the line 316 are given in Table 1.

TABLE 1

| Correction Vector | Line(s)/Bits Invalidated |
|---|---|
| 0000 | none/none |
| 0001 | 301/first bit |
| 0011 | 301, 302/first and second bits |
| 0111 | 301, 302, 303/first, second, and third bits |
| 1111 | 301, 302, 303, 304/first to fourth bits |

The different values of the correction vector lead to different invalidated subsequences of the valid bits. Invalidation modifies the subsequences of the valid bits to have a value of logic zero. Each of the four groups of output lines 357, 354, 355 and 356 from the GSPS 350 produces a sum for a speculative set of values for the valid bits as shown in Table 1.

Referring to FIGS. 2A and 3A, one embodiment allows M+1 different values for correction vectors where M is the number of selected bits entering on the lines 202 of FIG. 2A. Thus, the nine lines 301–309 have associated therewith 10 possible correction vectors with components $C_1, C_2, \ldots, C_9$. The first value for the correction vector, i.e., $(0,0, \ldots, 0)$, leaves the values of the valid bits received on the lines 301–309 without corrections. The (n+1)-th value for the correction vector corrects the first n ordered valid bits from the lines 202 to be invalid, i.e., have the value of the logic zero. Thus, the various forms for the correction vector; $C_1, \ldots, C_9$; correspond to the possible invalidated subsequences for the valid bits from the lines 301–309.

Table 2 gives the full set of states for the correction vector of the adder 300 of FIG. 3A. The selected values of the partial sums transmitted by output lines 340, 341, 342 and 343 of the sum selector 210 of FIG. 3A correspond to sums in which the speculative values of invalidated valid bits are zero.

TABLE 2

| Correction Vector | Line(s) Transmitting Invalidated Bits |
|---|---|
| 000000000 | NONE |
| 000000001 | 301 |
| 000000011 | 301, 302 |
| 000000111 | 301, 302, 303 |
| 000001111 | 301, 302, 303, 304 |
| 000011111 | 301, 302, 303, 304, 305 |
| 000111111 | 301, 302, 303, 304, 305, 306 |
| 001111111 | 301, 302, 303, 304, 305, 306, 307 |
| 011111111 | 301, 302, 303, 304, 305, 306, 307, 308 |
| 111111111 | 301, 302, 303, 304, 305, 306, 307, 308, 309 |

In some embodiments, the GSPS's 310, 320 and 350 of FIGS. 3A and 3B are implemented in probrammable logic devices ("PLD") or programmable logic arrays ("PLA"). The invention is intended to also cover other constructions for the GSPS's 310, 320 and 350, e.g., integrated circuits, which persons of skill in the art would be able to construct and use without undue experimentation in light of the present disclosure.

Figure 3C:
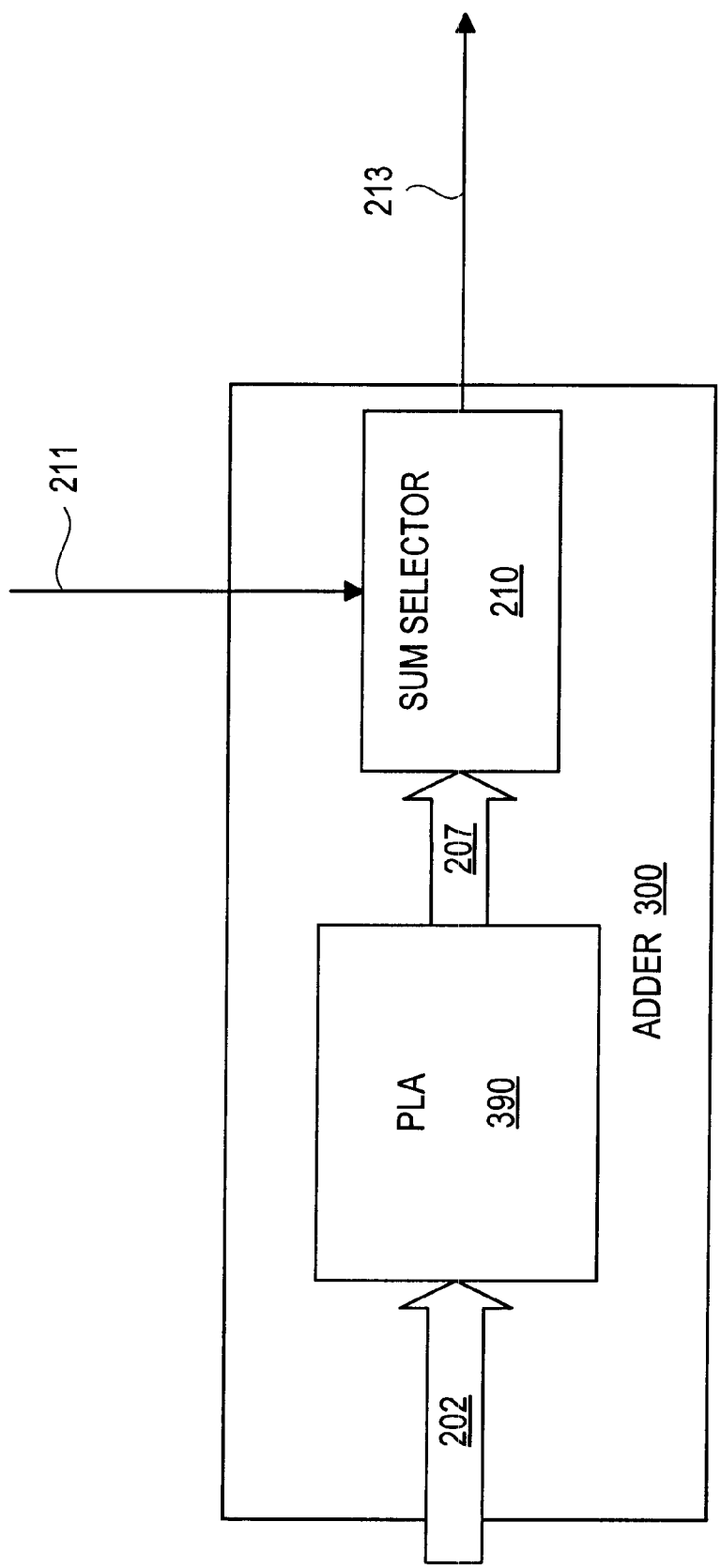
FIG. 3C is a block diagram illustrating one embodiment of the adder of FIG. 2a that includes a PLA that generates valid bits and partial sums from a group of machine vectors.

FIG. 3C illustrates an embodiment where the GSPS's 310, 320 and 350 are implemented in a PLA 390. The PLA used to generate both the valid bits and the partial sums for each $\mu$op, thus further optimizing the invention. To generate valid bits for the $\mu$ops using the PLA 3990, each "minterm" in the PLA 390 would output a set of valid bits. For example, suppose one of the minterms, e.g., minterm-XX, outputs the following:

$\mu$op 0: valid bit=1
$\mu$op 1: valid bit=1
$\mu$op 2: valid bit=1
$\mu$op 3: valid bit=0

Then, if the PLA inputs on the lines 202 activate minterm-XX, the PLA 390 would output 1,1,1,0 as the valid bits for $\mu$ops 0, 1, 2, and 3, respectively. The partial sum for each $\mu$op can be calculated by simply adding the valid bits preceding each $\mu$op. Accordingly, the partial sum for $\mu$op 1 would be the sum of the preceding valid bits, i.e., 1. Similarly, the partial sum for $\mu$op 2 would be the sum of the preceding valid bits (1+1=2). The partial sum for $\mu$op 3 would also be the sum of the preceding valid bits (1+1+1=3). No additional information is required to calculate the partial sum for each $\mu$op. Thus, no additional logic is required to generate the partial sums for each $\mu$op. Consequently, no additional PLA minterms are required to produce the partial sums. The number of PLA minterms is therefore minimized. A simple PLA routine can be written to generate the partial sums for the $\mu$ops based solely on the valid bits generated by the minterm.

In this way, both valid bit generation and speculative partial sum generation is logically combined in the same PLA 390, i.e., the PLA 390 has the same inputs and the same minterms for each set of $\mu$ops. This provides a major increase in processor performance because summing the valid bits and generating the partial sums both occur in the PLA 390. Thus, use of the PLA 390 to generate the valid bits and the partial sums saves time and chip space.

Referring to FIG. 3A, the sum selector ("SS") 210 receives the signals for the various speculative partial sums from the lines 313, 305, 323 and 309 and the components of the correction vector from the lines 316, 317, 318 and 319. As described above, the sum selector 210 can effectively invalidate subsets of the valid bits from the lines 301–309 by "selecting" the speculative partial sums from the lines 313, 305, 323 and 309 which correspond to sums of corrected values of the valid bits—corrected values of invalidated bits being logic zero. The GSPS's 310 and 320 performs speculative summations, because the sums add "speculative" values of the valid bits.

For some embodiments illustrated by FIGS. 2A and 3A, the correction vector may be unavailable until after the valid bits are received from the lines 202 or from the lines 301–309. For example, an execution exception occurring after the arrival of the valid bits on the lines 301–309 may produce the correction vector. By calculating a plurality of speculative sums and later selecting one of the speculative sums in response the receipt of the correction vector, the delay to process machine vectors may be reduced below the delay in the prior art adder 100 of FIG. 1.

Referring again to FIG. 3A, the adder 300 transmits to a line 340 a signal equal to the sum of the valid bits from the lines 301–304, as modified by the correction vector, and transmits to a line 382 a signal equal to the sum of the valid bits from the lines 301–308, as modified by the correction vector. The final sums on the line 340 and on the line 382 determine the storage addresses in the circular buffer 222 of FIG. 2B where the machine vectors associated to the valid bits on the lines 305 and 309 should be written. The sums on the line 340 and on the line 382 determine the number of machine vectors for valid $\mu$ops ordered earlier than the machine vectors associated with valid bits received from the lines 305 and 309, respectively.

Referring to FIGS. 3A and 3B, the adder 300 calculates the number of machine vectors for valid $\mu$ops ordered earlier than the fifth machine vector and ordered earlier than the ninth machine vector. The first GSPS 310 receives signals for valid bits from the lines 301–304. The first GSPS 310 generates values for sum of speculative values for the valid bits from the lines 301–304. The sums are speculative with respect to whether the $C_1$, $C_2$, $C_3$, and $C_4$ digits of the correction vector ($C_1$, $C_2$, ... $C_9$), will invalidate the valid bits from the lines 301–304. Five output lines 313 transmit the values for the speculative sums from the lines 356 of the GSPS 350 of FIG. 3B to data inputs of a multiplexer (MUX) 364 of FIG. 3A. The $C_1$, $C_2$, $C_3$, $C_4$ digits of the correction vector select the data input of the MUX 364 for the speculative sum that equals a sum of the valid bits are corrected by the correction vector. The sum selector 210 transmits a decoded signal for the selected sum to the output line 340.

Referring still to FIGS. 3A and 3B, the second GSPS 320 generates signals for sums of speculative values of the valid bits from the lines 306, 307, and 308. The sums are speculative with respect to whether the $C_6$, $C_7$ and $C_8$ digits of the correction vector ($C_1$, $C_2$, ... $C_9$) will invalidate any of the valid bits from the lines 306–308. Four output lines 323 transmit the speculative values for the partial sums from the GSPS 320 to data inputs of a MUX 366. The $C_6$, $C_7$ and $C_8$ digits of the correction vector select the data input of the MUX 366 for the sum that equals a sum of the valid bits as corrected by the correction vector. The sum selector 210 transmits a decoded signal for the selected sum to an output line 342.

Referring to FIG. 3A, the valid bits from the lines 305 and 309 go to first inputs of two AND-gates 362 and 363, respectively. The $C_5$ and $C_9$ digits of the correction vector go to the second inputs of the AND-gates 362 and 363, respectively. The AND-gates 362 and 363 transmit decoded signals, ie., logic one or zero, for the valid bits from the lines 305 and 309 as corrected by the correction vector, to output lines 341 and 343, respectively.

As illustrated in FIG. 3A, adder 300 uses decoded signals to internally calculate the corrected partial sums of the valid bits from the lines 301–308. The output line 341 from the AND-gate 362 transmits the corrected value of the valid bit from the line 305 to a shifter 370. The shifter 370 is a hardware device that produces a plurality of decoded signals on terminals 371. The decoded signals have six binary digits and correspond to possible values for the sum of the bit from the line 341 and the partial sum from the line 340. If the signal from the line 341 has the respective values of logic zero and logic one, the shifter 370 produces signals on the terminals 371 having the values 000001, 000010, 000100, 001000, 010000 and the values 000010, 000100, 001000, 010000, 100000, respectively. The signal from the line 340 operates select input terminals of the MUX 372 to produce a decoded number on the line 374, which is the sum of the corrected valid bits from the lines 301–305, respectively. Similarly, the MUX 366 transmits the decoded signal for the corrected sum of valid bits from the lines 306–308, respectively, to a second shifter 376. In a similar manner to the shifter 370, the shifter 376 produces six signals for decoded numbers at data input terminals 377 of a MUX 378. The partial sum from the MUX 372 operates the select terminals of the MUX 378 to produce a decoded signal on the output line 382 for the sum of the partial sums from the lines 374 and 342. Thus, the adder 300 produces decoded signals on the lines 340 and 382 for the sum of the valid bits for machine vectors earlier than the fifth and earlier than the ninth machine vectors, respectively.

Though the adder 300 of FIGS. 3A and 3B calculates the number of machine vectors for valid µops ordered earlier than the fifth and ninth machine vectors, other embodiments calculate the number of machine vectors for valid µops ordered earlier than other ones of the machine vectors of a group to be processed in parallel. For example, the adder 200 of FIG. 2A calculates the number of machine vectors for valid µops ordered before each of the machine vectors of a group.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An apparatus, comprising:
    a generator of speculative partial sums comprising an input for a valid bit of a micro-operation and a decoded speculative partial sum output; and
    a sum selector comprising an input coupled to the decoded speculative partial sum output; a correction vector input; and a selected speculative sum output.

2. The apparatus of claim 1, further comprising a device to generate the valid bit of the micro-operation coupled to the input for a valid bit.

3. The apparatus of claim 2, wherein said generator of speculative partial sums and the device to generate the valid bit of the micro-operation reside in a programmable logic device.

4. The apparatus of claim 1, further comprising a white address controller comprises an input coupled to the selected speculative sum output.

5. The apparatus of claim 4, wherein the write address controller further comprises an input for storage address of a previous group of machine vectors to enable parallel writes of groups of machine vectors without leaving unused buffer addresses between successive machine vectors.

6. The apparatus of claim 1, further comprising:
    a shifter comprising an input coupled to the selected speculative sum output and an output for possible values for a sum of the selected speculative sum output with a second selected speculative sum output; and
    a multiplexer comprising an input coupled to the output for possible values; an input for the second selected speculative sum output; and an output for the sum of the second selected speculative sum output with the selected speculative sum output.

7. The apparatus of claim 1, wherein:
    the input for a valid bit of a micro-operation comprises a four line input; and
    the decoded speculative partial sum output comprises a five line output.

8. The apparatus of claim 1, wherein said sum selector comprises a multiplexer.

9. The apparatus of claim 8, wherein
    the correction vector input comprises a four line input;
    the decoded speculative partial sum output comprises a five line decoded speculative partial sum output, a one line decoded speculative partial sum output, and a four line decoded speculative partial sum output; and
    the selected speculative sum output comprises three one-line outputs.

10. The apparatus of claim 9, wherein said sum selector further comprises a logic gate comprising one line of the four line input and the one line decoded speculative partial sum output.

11. A method, comprising:

generating a speculative partial sum of more than one valid bits of micro-operations and producing a selected speculative sum.

12. The method of claim 11, further comprising generating the more than one valid bits.

13. The method of claim 12, wherein the generating the more than one valid bits and said generating the speculative partial sum occur substantially simultaneously.

14. The method of claim 11, further comprising producing a third selected speculative sum by determining the sum of the selected speculative sum and a second selected speculative sum.

15. The method of claim 14, wherein producing the third selected speculative sum comprises:

generating a decoded number by left shifting the second selected speculative sum and identifying the decoded number with the selected speculative sum.

16. The method of claim 11, further comprising assigning a storage address to a machine vector for a valid micro-operation with the selected speculative sum.

17. The method of claim 16, wherein assigning the storage address comprises summing the selected speculative sum with a second storage address.

18. The method of claim 17, wherein summing the selected speculative sum with the second storage address comprises summing the selected speculative sum with a storage address for a previous group of machine vectors to enable parallel writes of groups of machines vectors without leaving unused buffer addresses between successive machine vectors.

19. The method of claim 11, wherein said generating a speculative partial sum of more than one valid bits of micro-operations, comprises:

receiving the more than one valid bits;

calculating a decoded number for a speculative partial sum of the more than one valid bits; and transmitting the decoded number for the speculative partial sum to an output.

20. The method of claim 19, wherein calculating the decoded number comprises calculating the decoded numbers for the speculative partial sums of a first two, a first three, and a first four valid bits.

21. The method of claim 11, wherein said producing a selected speculative sum comprises:

receiving a correction vector;

identifying the speculative partial sum with the correction vector; and transmitting the speculative partial sum to an output.

22. The method of claim 21, wherein identifying the speculative partial sum with the correction vector comprises identifying the speculative partial sum with invalidated valid bits corresponding to invalidated valid bits identified by the correction vector.

23. A system, comprising:

a device to generate a valid bit of a micro-operation of a machine vector;

a generator of speculative partial sums coupled to said device to generate a valid bit;

a sum selector coupled to said generator of speculative sums; and a write address controller in communication with a buffer and a machine vector receive line and coupled to said sum selector.

24. The system of claim 23, further comprising:

a shifter coupled to said sum selector and a multiplexer coupled to the shifter and to a second sum selector.

25. The system of claim 23, wherein said generator of speculative partial sums and said device to generate a valid bit of a micro-operation reside in a programmable logic array.

26. The system of claim 25, wherein the programmable logic array comprises a parallel input coupled to the machine vector receive line and a parallel output coupled to said sum selector.

27. The system of claim 23, wherein said sum selector comprises a multiplexer.

28. The system of claim 27, wherein said sum selector comprises a parallel input coupled to said generator of speculative partial sums and a serial output coupled to said write address controller.

29. The system of claim 23, wherein said write address controller comprises a serial input coupled to said sum selector and a serial output coupled to the buffer and the machine vector receive line.

30. The apparatus of claim 29, wherein said write address controller comprises a second serial input coupled to a line for a storage address.

* * * * *

UNITED STATES PATENT AND TRADEMARK OFFICE
CERTIFICATE OF CORRECTION

PATENT NO.    : 6,363,408 B1
DATED         : March 26, 2002
INVENTOR(S)   : Khan et al.

It is certified that error appears in the above-identified patent and that said Letters Patent is hereby corrected as shown below:

Drawings,
Fig. 1, delete "125".

Column 1,
Line 28, before "vectors", delete "as".
Line 57, after "adder", insert -- 100 --.

Column 4,
Line 45, after "indicated", delete "is".

Column 7,
Line 27, after "value of", delete "the".
Line 61, before "used", insert -- 390 is --.

Signed and Sealed this

Twenty-fourth Day of September, 2002

Attest:

JAMES E. ROGAN
Attesting Officer        Director of the United States Patent and Trademark Office